Aug. 8, 1950     R. K. SCHERIG     2,518,076
GUARD FOR MATERIAL CUTTING APPARATUS
Filed March 5, 1949     3 Sheets-Sheet 1
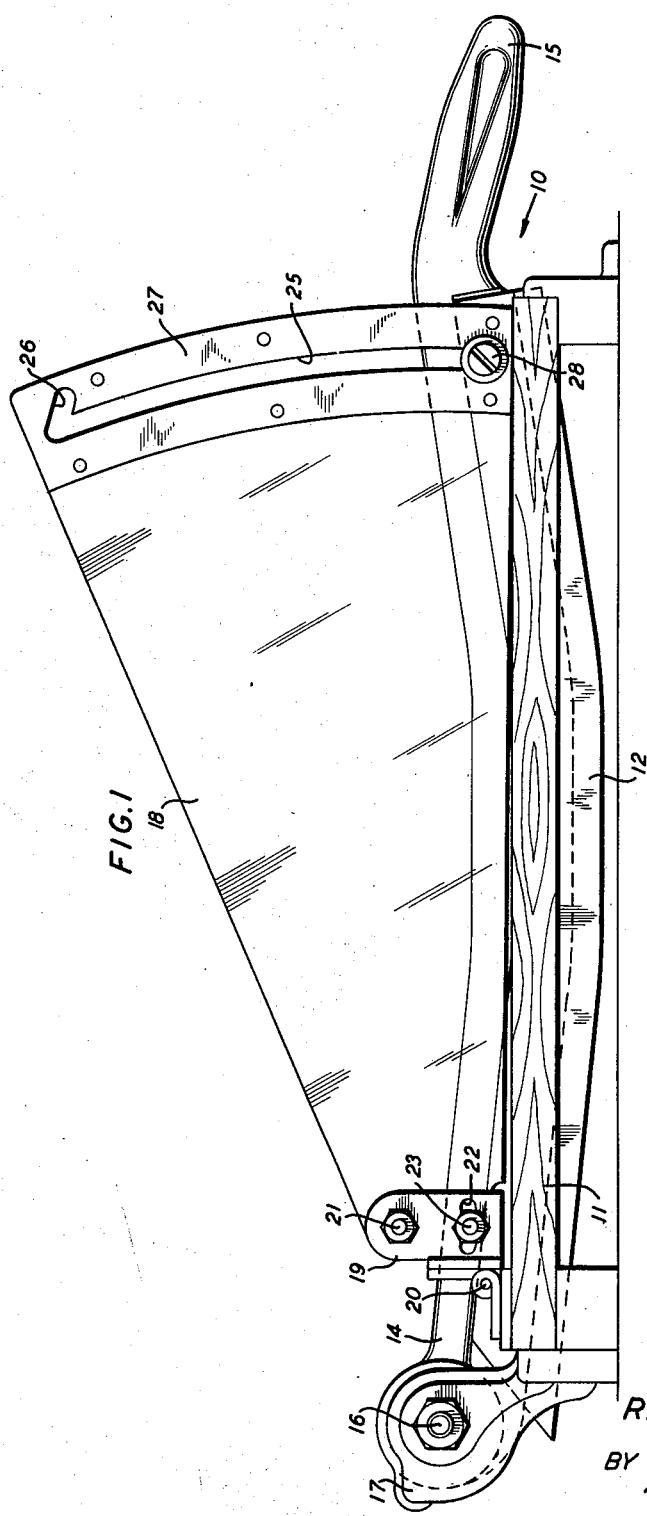
INVENTOR
R. K. SCHERIG
BY *W. C. Parnell*
ATTORNEY

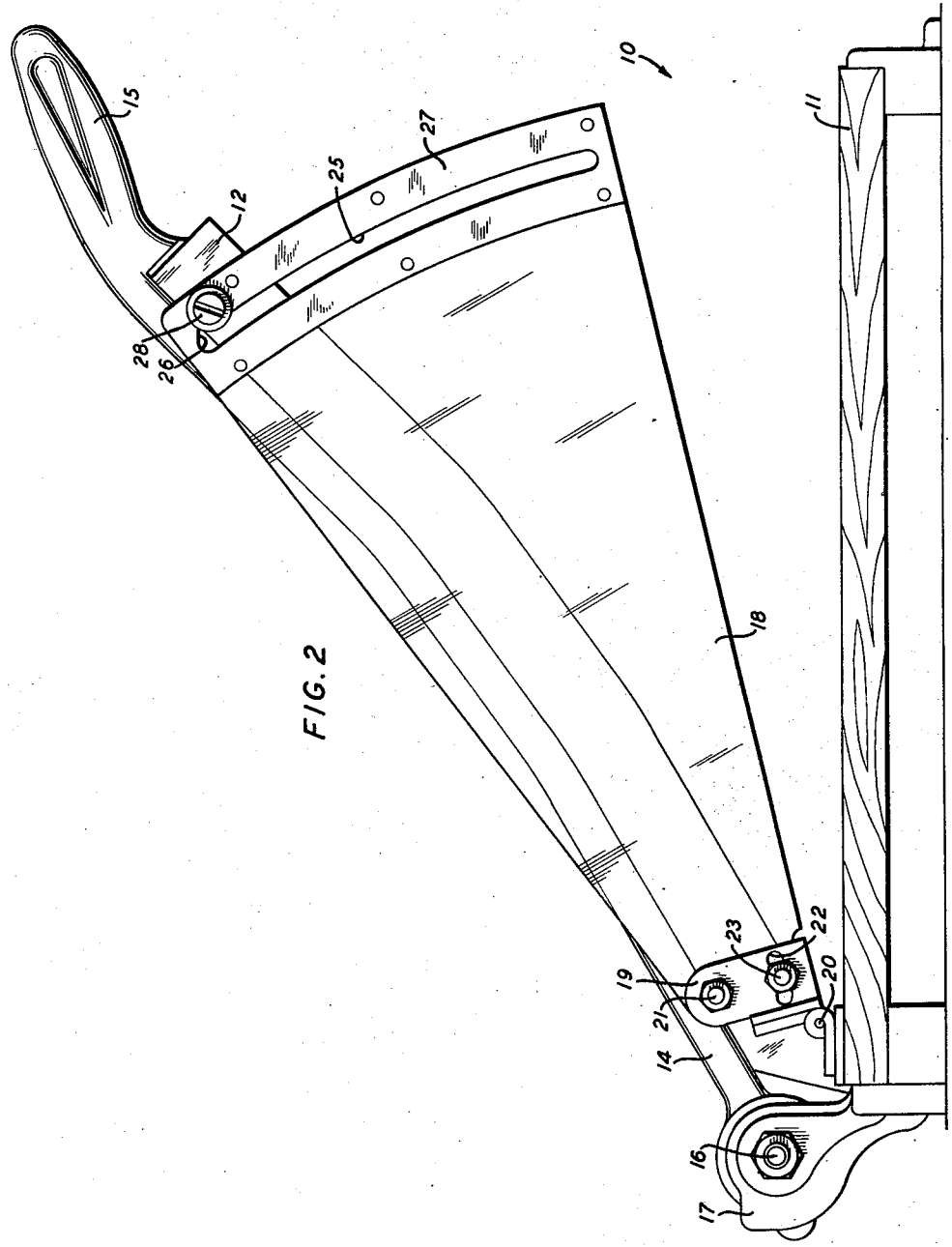

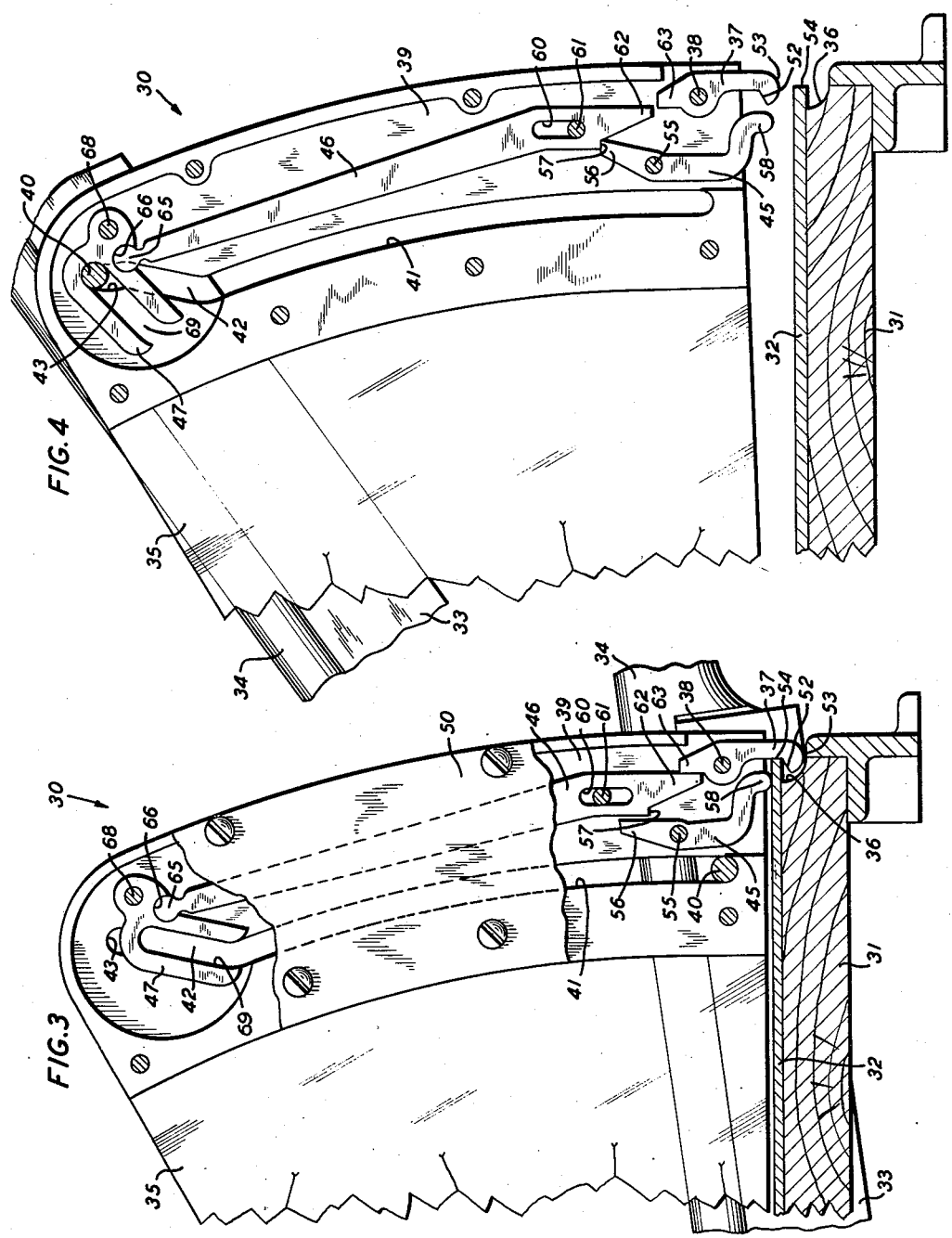

Patented Aug. 8, 1950

2,518,076

UNITED STATES PATENT OFFICE 2,518,076

GUARD FOR MATERIAL CUTTING APPARATUS

Roy K. Scherig, Avenel, N. J., assignor to Western Electric Company, Incorporated, New York, N. Y., a corporation of New York Application March 5, 1949, Serial No. 79,827

6 Claims. (Cl. 164—44)

This invention relates to guards for material cutting apparatus and has for its object the provision of a guard to shield the cutting area of the apparatus and hold the cutting blades against relative movement to cut material until the guard is in its shielding position.

In commercially known material cutting apparatus, for example, those better known as paper cutters having a table to support the material relative to a stationary blade at one end of the table and a movable blade pivoted at one end for movement relative to the stationary blade, it has been found that operators will sometimes imprudently place their fingers within the cutting area in attempting to support the material adjacent the blades during cutting operations.

With the aforementioned object in view, the invention comprises a guard for a cutting apparatus having a material supporting table, a cutting member fixedly mounted at one end of the table and a movable cutting element supported by a pivot disposed adjacent one end of the stationary cutting member, the guard having a main member of sufficient size to cover the cutting area of the apparatus. An elongate aperture is formed near one end of the main member to receive a projection carried by the free end of the cutting element whereby the cutting element may be moved about its pivot away from the cutting member to the end of the elongate aperature in the guard where continued movement will move the main member away from the table to allow for material to be positioned therebeneath and over the cutting member. During movement of the main member out of the cutting area, means will cooperate with the projection carried by the cutting element to secure the cutting element and main member against relative movement until the main member is returned to its shielding position. In one species of the invention a lateral portion of the aperture will be caused to receive the projection due to a pivot supporting the other end of the main member being disposed short of the pivot for the cutting element whereby any object greater in thickness than the material to be cut will render this connecting means effective to hold the cutting element against movement into cutting position until the object is removed from beneath the main member.

In another species of the invention, a mechanism is provided to latch the main member in its shielding position and to hold the cutting element against movement into cutting position until the main member is so latched.

Other objects and advantages will be apparent from the following detailed description when considered in conjunction with the accompanying drawings, wherein:

Fig. 1 is a side elevational view of one species of the invention shown in combination with a material cutting apparatus, the movable cutting element in this figure being shown in its closed position;

Fig. 2 is a side elevational view of the structure shown in Fig. 1 with the movable cutting element in its open position;

Fig. 3 is a fragmenary sectional view of another species of the invention illustrating the main member locked in its closed position; and Fig. 4 is a fragmentary sectional view of the structure shown in Fig. 3 illustrating the main member in its open position.

Referring now to the drawings, attention is first directed to Figs. 1 and 2 which illustrate a material cutting apparatus indicated generally at 10 having a material supporting table 11 provided with the conventional type of stationary cutting member (not shown) mounted along one end thereof to cooperate with a movable cutting element 12 to cut material into predetermined lengths or to trim the material. The cutting element 12 is mounted on an arm 14 having a handle 15 at one end and supported by a pivot 16 at the other end, the pivot being carried by a bracket 17 which is mounted at the back of the table 11.

The guard in this species of the invention is formed mainly of a plastic material such as Lucite, the main member 18 of the guard being substantially pie-shaped having its smaller end secured to a bracket 19 of a hinge 20. The hinge 20, which may be termed a pivot for the main member, is fixedly mounted upon the table 11 short of the pivot 16. The bracket 19 of the hinge 20 is provided with an aperture for a bolt 21, and an elongate aperture 22 for a bolt 23. The bolts 21 and 23 extend through apertures in the main member 18 and through this arrangement, the main member may be adjusted relative to the bracket 19 and the hinge or pivot 20, depending upon the thickness of the material to be cut. The larger end of the main member has an elongate aperture 25 therein about the axis of the hinge 20, the upper end of the aperture 25 extending laterally at 26. Metal reinforcing plates 27 are disposed upon each side of the main member 18 to eliminate excess wear on the main member in the aperture. If desired, a U-shaped metal reinforcing member may be employed in place of the plates 27. A projection, in the form of a screw 28, carried by the cutting element 12 extends through the aperture 25 and is positioned to ride vertically in the aperture as the cutting element 12 is moved about the pivot 16, as shown in Fig. 2.

The operation of this species of the invention is such that the guard continues to rest upon the table 11 or upon the material which has previously been cut completely guarding the cutting area during movement of the cutting element 12 from the position shown in Fig. 1 to the position shown in Fig. 2. To move the guard out of the material cutting area, it is necessary to move the cutting element 12 upwardly a distance which will cause the projection 28 to move into the lateral portion 26 of the aperture 27. This is brought about due to the spacing of the pivot 20 for the main member short of the pivot 16 for the cutting element 12. In other words, the moment the main member is moved out of the cutting area, it is connected to the cutting element 12 and will move therewith until the main member has been returned to the material cutting area, within a predetermined distance of the table, before it will become disconnected with the cutting element 12 and allow the cutting element to move about its pivot 16 to form a cutting operation.

The species of the invention shown in Figs. 3 and 4 is identical with the species shown in Figs. 1 and 2 with the exception of the free end of the main member and the control mechanism indicated generally at 30 to secure the projection to the main member and latch the main member to the table 31. In this species of the invention, a metal strip 32, which is part of the cutting apparatus and may constitute the cutting member to cooperate with the cutting element 33 to cut the material. The cutting element is mounted on the arm 34 pivoted in the same manner as shown (pivot 16) in Figs. 1 and 2 at a position spaced from the pivotal support or hinge (such as 20, Figs. 1 and 2) for the main portion 35 of the guard 30. The table is provided with a recess 36 to receive a latch 37 as illustrated in Fig. 3, the latch being pivotally supported at 38 in a narrow compartment 39 in the end 30 of the guard. A projection or pin 40 movable with the cutting element 33 is free to move in an elongate aperture 41 which has a diagonally extending upper portion 42 and a smaller arcuate portion 43.

The latch 37 together with a catch 45, a reciprocating element 46 and a retaining element 47 are all formed of flat stock material equal in thickness and lying in the same plane whereby they may be readily housed in the narrow compartment 39 in the end 30 beneath a cover 50. The latch 37 is so constructed that the hook-like end 52 thereof with its rounded nose 53 will ride over the end 54 of the member 32 and swing into position as shown in Fig. 3. The catch 45, as shown in Fig. 4, is supported by a pivot 55 with a projection 56 normally positioned to engage a shoulder 57 of the reciprocating element 46 to hold the element upwardly until the lower end 58 of the latch engages the table, or the cutting element 32, when the main member 35 of the guard is in its lowermost position or in a position covering the cutting area of the apparatus.

The element 46 is controlled in its reciprocable movement by an elongate aperture 60 moving relative to a pin 61 to guide the lower end of the element, particularly the nose 62 thereof in front of the upwardly projecting portion 63 of the catch 37 as shown in Fig. 3. A ball-like member, which in the present instance is a circular portion 65 on the upper end of the element 46, is disposed in a circular cutaway portion 66 of the retaining element 47, providing an operative connection between the elements 46 and 47. The element 47 is pivotally mounted at 68 and has an opening 69 movable into registration with the diagonally extending portion 42 of the aperture 41 when in the position shown in Fig. 3 to receive the projection 40 of the cutting element 33.

Considering now the operation of the species of the invention shown in Figs. 3 and 4, let it be assumed that the main member 35 of the guard is in the locked position shown in Fig. 3 at the completion of a cutting operation. The cutting element 33 with the handle or arm 34 may be moved upwardly about its pivot to move the projection 40 upwardly in the aperture 41 to the extreme upper end thereof including the diagonal portion 42 and the arcuate portion 43. As the projection 40 travels through the diagonal portion 42 of the aperture, it will enter the opening 69 of the retaining element 47 and when it reaches the inner extremity of the opening, it will move the retaining element about its pivot 68, causing upward movement of the element 46, to release the latch 37, to free the main member of the guard for movement upwardly about its pivot. As soon as the main member of the guard is moved away from the table or the first cutting member 32, the catch 45 will move about its pivot 55 until the upper end 56 thereof is moved beneath the shoulder 57 of the element 46. The catch 45 is so formed that it will rock clockwise of its own weight into the position described to hold the element 46 in the position shown in Fig. 4 to hold the retaining element 57 out of registration with portion 42 of the aperture 41 and providing a positive locking connection between the cutting element 33 and the main member 35 of the guard. It is not possible for the cutting element to move relative to the main member 35 until the main member is returned to its shielding position in front of the cutting area of the apparatus. At this time, the catch 45 will engage the table or cutting member 32 to trip the catch and allow the reciprocating element 46 to move downwardly a given distance to align the opening 69 of the retaining element with the diagonal portion 42 of the aperture 41. When this takes place, the latch 37 has already assumed its position with the hooked end 52 around the adjacent end of the cutting member 32 whereby downward movement of the reciprocating element 46 will hold the latch in this position during the completion of the cutting operation, and until the cutting element 33 has again been moved upwardly to the position shown in Fig. 4.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A guard for a material cutting apparatus having a table to support material to be cut, a fixed position cutting member mounted at one end of the table and cooperating with a cutting element, having one end mounted on a pivot disposed adjacent one end of the cutting member, to cut the material when fed therebetween during movement of the cutting element between its open and closed position, the guard comprising a main member of sufficient size to shield the cutting area of the apparatus during movement of the cutting element relative to the cutting member, a pivot to support the main member disposed at a position spaced from the pivot for the cutting element, and means operatively connecting the cutting element to the main member to cause the cutting element to move the main member free of the cutting area and to hold the cutting element against movement into the closed position until the main member is moved into its shielding position.

2. A guard for a material cutting apparatus having a table to support material to be cut, a fixed position cutting member mounted at one end of the table and cooperating with a cutting element, having one end mounted on a pivot disposed adjacent one end of the cutting member, to cut the material when fed therebetween during movement of the cutting element between its open and closed position, the guard comprising a main member having an elongate aperture in one end thereof and being of sufficient size to shield the cutting area of the apparatus during movement of the cutting element relative to the cutting member, a projection carried by the cutting element positioned to ride in the aperture of the main member to move the main member free of the cutting area when the projection reaches the end of the aperture, and means disposed at the upper end of the aperture to receive the projection and connect the cutting element and the main member against relative movement until the main member is returned to shield the cutting area.

3. A guard for a material cutting apparatus having a table to support material to be cut, a fixed position cutting member mounted at one end of the table and cooperating with a cutting element, having one end mounted on a pivot disposed adjacent one end of the cutting member, to cut the material when fed therebetween during movement of the cutting element between its open and closed position, the guard comprising a main member having an elongate aperture in one end thereof with an offset portion adjacent the upper end thereof providing a shoulder, the main member being of sufficient size to shield the cutting area of the apparatus during movement of the cutter element relative to the cutting member, a projection carried by the cutting element positioned to ride in the aperture of the main member to move the main member free of the cutting area when the projection reaches the end of the aperture, and a pivot for supporting the other end of the main member short of the pivot for the cutting element whereby movement of the main member away from the table will cause the shoulder of the said offset portion of the aperture to move beneath the projection to latch the cutting element to the main member until the main member is returned to its shielding position adjacent the table.

4. A guard for a material cutting apparatus having a table to support material to be cut, a fixed position cutting member mounted at one end of the table and cooperating with a cutting element, having one end mounted on a pivot disposed adjacent one end of the cutting member, to cut the material when fed therebetween during movement of the cutting element between its open and closed position, the guard comprising a main member having an elongate aperture in one end thereof and being of sufficient size to shield the cutting area of the apparatus during movement of the cutting element relative to the cutting member, a projection carried by the cutting element positioned to ride in the aperture of the main member to move the main member free of the cutting area when the projection reaches the end of the aperture, a latch to secure the main member in its shielding position, and means actuable by the projection when moved into a position to move the main member into its open position to release the latch.

5. A guard for a material cutting apparatus having a table to support material to be cut, a fixed position cutting member mounted at one end of the table and cooperating with a cutting element, having one end mounted on a pivot disposed adjacent one end of the cutting member, to cut the material when fed therebetween during movement of the cutting element between its open and closed position, the guard comprising a main member having an elongated aperture in one end thereof and being of sufficient size to shield the cutting area of the apparatus during movement of the cutting element relative to the cutting member, a projection carried by the cutting element positioned to ride in the aperture of the main member to move the main member free of the cutting area when the projection reaches the end of the aperture, a retaining element having an opening to register with the said aperture during movement of the cutting element with the projection into the open position, to move the main member free of the table, and actuable by the projection to close the aperture to retain the projection against movement therein until the main member is returned to its shielding position.

6. A guard for a material cutting apparatus having a table to support material to be cut, a fixed position cutting member mounted at one end of the table and cooperating with a cutting element, having one end mounted on a pivot disposed adjacent one end of the cutting member, to cut the material when fed therebetween during movement of the cutting element between its open and closed position, the guard comprising a main member having an elongate aperture in one end thereof and being of sufficient size to shield the cutting area of the apparatus during movement of the cutting element relative to the cutting member, a projection carried by the cutting element positioned to ride in the aperture of the main member to move the main member free of the cutting area when the projection reaches the end of the aperture, a retaining element having an opening to register with the said aperture during movement of the cutting element with the projection into the open position, to move the main member free of the table, and actuable by the projection to close the aperture to retain the projection against movement therein until the main member is returned to its shielding position, and a catch to hold the retaining element in its retaining position, positioned to engage the table or the material thereon and be actuated to release the retaining element when the main member is returned to its shielding position.

ROY K. SCHERIG.

REFERENCES CITED

The following references are of record in the file of this patent:

UNITED STATES PATENTS

| Number | Name | Date |
|---|---|---|
| 1,998,245 | Laukhuff | Apr. 16, 1935 |